US010972677B2

(12) United States Patent
Honda et al.

(10) Patent No.: US 10,972,677 B2
(45) Date of Patent: Apr. 6, 2021

(54) IMAGING CONTROL APPARATUS AND IMAGING CONTROL METHOD

(71) Applicant: SONY CORPORATION, Tokyo (JP)

(72) Inventors: Yutaro Honda, Kangawa (JP); Satoko Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 84 days.

(21) Appl. No.: 16/328,142

(22) PCT Filed: Jul. 6, 2017

(86) PCT No.: PCT/JP2017/024754
§ 371 (c)(1),
(2) Date: Feb. 25, 2019

(87) PCT Pub. No.: WO2018/051615
PCT Pub. Date: Mar. 22, 2018

(65) Prior Publication Data
US 2019/0199906 A1 Jun. 27, 2019

(30) Foreign Application Priority Data

Sep. 14, 2016 (JP) .............................. JP2016-179441

(51) Int. Cl.
| H04N 5/235 | (2006.01) |
| G03B 7/091 | (2006.01) |
| G03B 15/00 | (2021.01) |
| H04N 5/232 | (2006.01) |
| G03B 7/093 | (2021.01) |

(52) U.S. Cl.
CPC .......... *H04N 5/2357* (2013.01); *G03B 7/091* (2013.01); *G03B 7/093* (2013.01); *G03B 15/00* (2013.01); *H04N 5/232* (2013.01); *H04N 5/2353* (2013.01)

(58) Field of Classification Search
CPC .... H04N 5/2357; H04N 5/2353; G03B 7/091; G03B 7/093; G03B 15/00
See application file for complete search history.

(56) References Cited

U.S. PATENT DOCUMENTS

| 2010/0053369 A1 | 3/2010 | Nagai | |
| 2016/0006919 A1* | 1/2016 | Aoyama | .................. G01J 1/28 348/226.1 |
| 2017/0126952 A1 | 5/2017 | Aoyama | |

FOREIGN PATENT DOCUMENTS

| CN | 101662591 A | 3/2010 |
| JP | 2004-200885 A | 7/2004 |

(Continued)

OTHER PUBLICATIONS

Extended European Seach Report for EP Patent Application No. 17850521.0, dated Oct. 2, 2019, 12 pages.

(Continued)

*Primary Examiner* — Twyler L Haskins
*Assistant Examiner* — Fayez Bhuiyan
(74) *Attorney, Agent, or Firm* — Chip Law Group

(57) ABSTRACT

An imaging control apparatus includes: a flicker detecting section configured to detect a flicker component of a light source, the flicker component being included in an image; and a controlling section configured to control timing of imaging according to a detection result by the flicker detecting section, in which the controlling section controls the timing of the imaging according to timing of a peak or a bottom of the flicker component detected.

17 Claims, 13 Drawing Sheets

(56) References Cited

FOREIGN PATENT DOCUMENTS

| JP | 2010-056685 A | 3/2010 |
|----|---------------|--------|
| JP | 2015-211231 A | 11/2015 |
| JP | 6370134 B2 | 8/2018 |

OTHER PUBLICATIONS

Tajbakhsh, et al., "Illumination Flicker Correction and Frequency Classification Methods", Proceedings of SPIE, vol. 6502, Feb. 2007, 10 pages.
Partial Supplementary European Search Report of EP Application No. 17850521.0, dated Jul. 1, 2019, 13 pages.
Tajbakhsh, et al., "Illumination Flicker Correction and Frequency Classification Methods", Proceedings of SPIE, vol. 6502, Feb. 15, 2007, 10 pages.
International Search Report and Written Opinion of PCT Application No. PCT/JP2017/024754, dated Sep. 19, 2017, 14 pages of ISRWO.

* cited by examiner

| EXPOSURE TIME (SHUTTER SPEED) | INVERSION |
|---|---|
| FASTER THAN 1/100 (= 1/100) | NOT INVERTED |
| FASTER THAN 1/50 (= 2/100) | INVERTED |
| FASTER THAN 1/33 (= 3/100) | NOT INVERTED |
| FASTER THAN 1/25 (= 4/100) | INVERTED |
| FASTER THAN 1/20 (= 5/100) | NOT INVERTED |
| FASTER THAN 1/16 (= 6/100) | INVERTED |
| ⋮ | |
| ⋮ | |

FIG. 14

| | AT TIME OF DETECTION | AT TIME OF PHOTOGRAPHING | PROCESS |
|---|---|---|---|
| PATTERN 1 | NOT INVERTED | NOT INVERTED | DETECTED BLINKING PEAK IS CORRECT. PHOTOGRAPH AT DETECTED PEAK POSITION SINCE NO INVERSION OCCURS AT TIME OF PHOTOGRAPHING AS WELL. |
| PATTERN 2 | NOT INVERTED | INVERTED | DETECTED BLINKING PEAK IS CORRECT. PHOTOGRAPH AT DETECTED TROUGH POSITION SINCE INVERSION OCCURS AT TIME OF PHOTOGRAPHING. |
| PATTERN 3 | INVERTED | NOT INVERTED | DETECT TROUGH POSITION AS PEAK SINCE DETECTED BLINKING IS INVERTED. PHOTOGRAPH AT DETECTED PEAK POSITION SINCE NO INVERSION OCCURS AT TIME OF PHOTOGRAPHING. |
| PATTERN 4 | INVERTED | INVERTED | DETECT TROUGH POSITION AS PEAK SINCE DETECTED BLINKING IS INVERTED. PHOTOGRAPH AT DETECTED TROUGH POSITION SINCE INVERSION OCCURS AT TIME OF PHOTOGRAPHING AS WELL. |

IMAGING CONTROL APPARATUS AND IMAGING CONTROL METHOD

CROSS REFERENCE TO RELATED APPLICATIONS

This application is a U.S. National Phase of International Patent Application No. PCT/JP2017/024754 filed on Jul. 6, 2017, which claims priority benefit of Japanese Patent Application No. JP 2016-179441 filed in the Japan Patent Office on Sep. 14, 2016. Each of the above-referenced applications is hereby incorporated herein by reference in its entirety.

TECHNICAL FIELD

The present disclosure relates to an imaging control apparatus and an imaging control method.

BACKGROUND ART

Fluorescent lamps that have been widely used as interior light sources, LEDs (Light Emitting Diodes) that have been becoming widely used in recent years, and the like generate a so-called flicker. A flicker is periodical blinking of illumination light that occurs due to the influence of a commercial power supply frequency. There have been proposed technologies related to an imaging apparatus for preventing the deterioration of the image quality such as color unevenness due to such a flicker (for example, refer to PTL 1 described below).

CITATION LIST

Patent Literature

[PTL 1]
  JP 2014-220763A

SUMMARY

Technical Problem

In such a field, there has been a demand for efficient reduction of the deterioration of the image quality due to a flicker.

The present disclosure has been made in view of the foregoing issue. It is an object of the present disclosure to provide an imaging control apparatus and an imaging control method that prevent the deterioration of the image quality due to a flicker.

Solution to Problem

In order to solve the above-described issue, the present disclosure is, for example, an imaging control apparatus including: a flicker detecting section configured to detect a flicker component of a light source, the flicker component being included in an image; and a controlling section configured to control timing of imaging according to a detection result by the flicker detecting section, in which the controlling section controls the timing of the imaging according to timing of a peak or a bottom of the flicker component detected.

Further, the present disclosure is, for example, an imaging control apparatus including a flicker detecting section configured to detect a flicker component of a light source, the flicker component being included in an image, in which the flicker detecting section outputs, according to exposure time of a sensor section at a time of the detection, information in which a phase of the flicker component detected is inverted.

Further, the present disclosure is, for example, an imaging control apparatus including a controlling section configured to control first exposure time of a first sensor section at a time of detection of a flicker component and second exposure time of a second sensor section at a time of imaging, in which the controlling section adjusts at least one of the first exposure time or the second exposure time so as to include, within each of the first exposure time and the second exposure time, an odd number or an even number of the flicker components each corresponding to one cycle and so as not to be an integer multiple of a cycle of the flicker component.

Further, the present disclosure is, for example, an imaging control method including: detecting, by a flicker detecting section, a flicker component of a light source, the flicker component being included in an image; and controlling, by a controlling section, timing of imaging according to a detection result of the flicker component, in which the controlling section controls the timing of the imaging according to timing of a peak or a bottom of the flicker component detected.

Further, the present disclosure is, for example, an imaging control method including detecting, by a flicker detecting section, a flicker component of a light source, the flicker component being included in an image, and outputting, according to exposure time of a sensor section at a time of the detection, information in which a phase of the flicker component detected is inverted.

Further, the present disclosure is, for example, an imaging control method including: controlling, by a controlling section, first exposure time of a first sensor section at a time of detection of a flicker component and second exposure time of a second sensor section at a time of imaging; and adjusting, by the controlling section, at least one of the first exposure time or the second exposure time so as to include, within each of the first exposure time and the second exposure time, an odd number or an even number of the flicker components each corresponding to one cycle and so as not to be an integer multiple of a cycle of the flicker component.

Advantageous Effect of Invention

According to at least one embodiment of the present disclosure, it is possible to prevent the deterioration of the image quality due to a flicker. It is noted that the effect described here is not necessarily limitative, and any of the effects described in the present disclosure may be provided. Further, the contents of the present disclosure should not be interpreted as being limited by the exemplified effects.

BRIEF DESCRIPTION OF DRAWINGS

FIG. 11 is a diagram of assistance in explaining an example of a process executed by the flicker detecting section, and the like.

FIG. 13 is a diagram of assistance in explaining an example of a process executed by a system controller, and the like.

FIG. 14 is a diagram illustrating a process for each pattern, patterning and illustrating a relationship between whether the peak position of the flicker component is inverted at the time of detection and timing for synchronizing timing of actual photographing.

DESCRIPTION OF EMBODIMENTS

Hereinafter, an embodiment and the like of the present disclosure will be described with reference to the drawings. It is noted that description will be made in the following order.

1. One Embodiment

2. Modification

The embodiment and the like described below are preferred specific examples of the present disclosure, and the contents of the present disclosure are not limited to these embodiment and the like.

1. One Embodiment

[Example of Configuration of Imaging Apparatus]
"Example of Overall Configuration"

Figure 1:
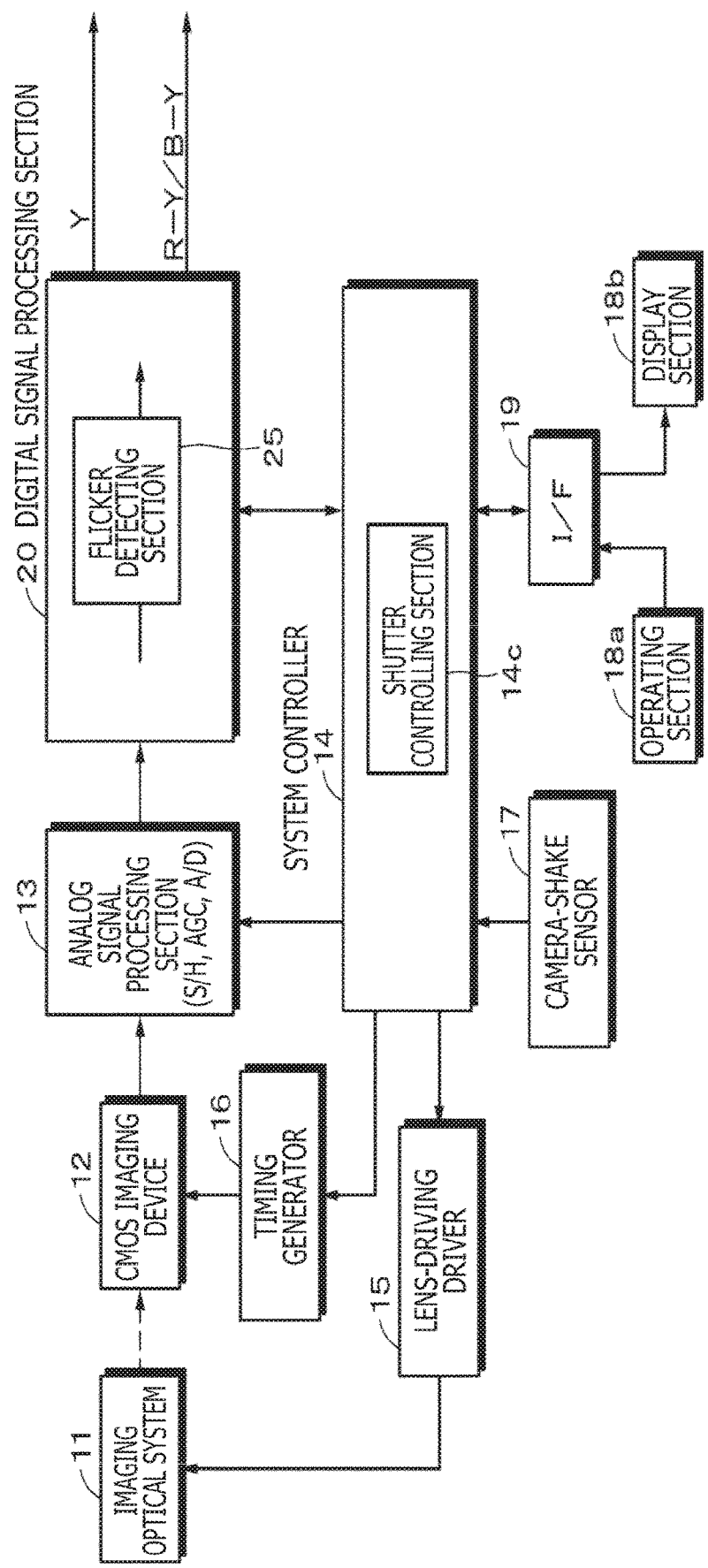
FIG. 1 is a block diagram depicting an example of a configuration of an imaging apparatus according to one embodiment of the present disclosure.

FIG. 1 depicts an example of a configuration of an imaging apparatus (imaging apparatus 100) according to an embodiment of the present disclosure. In the imaging apparatus 100, a CMOS (Complementary Metal Oxide Semiconductor) imaging device 12 receives light from an object through an imaging optical system 11 and performs photoelectrical conversion. An analog image signal can be obtained from the CMOS imaging device 12. For example, an imaging section includes the imaging optical system 11 and the CMOS imaging device 12.

The CMOS imaging device 12 is an example of a sensor section. The CMOS imaging device 12 includes a vertical scanning circuit, a horizontal scanning circuit, and a video signal output circuit in addition to a plurality of pixels arranged and formed in a two-dimensional array. The plurality of pixels each includes a photodiode (photo gate), a transfer gate (shutter transistor), a switching transistor (address transistor), an amplification transistor, a reset transistor (reset gate), and the like, on a CMOS substrate.

The CMOS imaging device 12 may be of either a primary color system or a complementary color system, as described later. The analog image signal obtained from the CMOS imaging device 12 is a primary color signal of each of RGB colors or a color signal of the complementary color system.

An analog signal processing section 13 is configured as an IC (Integrated Circuit). The analog signal processing section 13 samples and holds the analog image signal for each color signal received from the CMOS imaging device 12 and controls gain through AGC (Automatic Gain Control). The analog signal processing section 13 performs A/D (Analog to Digital) conversion to convert the analog image signal into a digital signal.

A digital signal processing section 20 is configured as an IC and functions as a detecting section. The digital signal processing section 20 processes the digital image signal received from the analog signal processing section 13, as described later. Then, a flicker detecting section 25 in the digital signal processing section 20 detects a flicker component for each signal component and reduces the flicker component appropriately, as described later. Finally, the flicker detecting section 25 converts the digital image signal into a luminance signal Y and red and blue color difference signals R−Y and B−Y. The digital signal processing section 20 outputs the luminance signal Y and the red and blue color difference signals R−Y and B−Y.

A system controller 14 is an example of a controlling section. The system controller 14 includes a microcomputer and the like, and controls each section of the imaging apparatus 100. As an example, the system controller 14 controls the timing of imaging (for example, actual photographing) according to a detection result by the flicker detecting section 25.

Specifically, the system controller 14 supplies a lens driving control signal to a lens-driving driver 15. The lens-driving driver 15 includes an IC and drives a lens and an iris of the imaging optical system 11.

Further, the system controller 14 supplies a timing control signal to a timing generator 16. The timing generator 16 supplies various timing signals to the CMOS imaging device 12 to drive the CMOS imaging device 12.

At this time, the shutter speed (exposure time) of the CMOS imaging device 12 is also controlled by the timing control signal received from the system controller 14. Specifically, a shutter controlling section 14c in the system controller 14 sets the shutter speed. The shutter speed is set manually or automatically according to a mode, for example.

In addition, the system controller 14 obtains a detected signal of each signal component from the digital signal processing section 20. The analog signal processing section 13 controls the gain of each color signal according to the AGC signal received from the system controller 14, as described above. The system controller 14 also controls the signal process in the digital signal processing section 20.

Further, a camera-shake sensor 17 is connected to the system controller 14. Camera-shake information obtained therefrom is used to correct camera shake.

Further, an operating section 18a and a display section 18b are connected to the system controller 14 through an interface 19. The interface 19 includes a microcomputer and the like. A user interface 18 includes the operating section 18a and the display section 18b. The system controller 14 detects a setting operation, a selection operation, and the like in the operating section 18a. The system controller 14 also causes the display section 18b to display setting status, control status, and the like of a camera. For example, the operating section 18a can be used to set whether or not flickerless photographing described later is performed.

It is noted that the imaging apparatus 100 may include a storage apparatus. The storage apparatus may be a hard disk or the like that is built in the imaging apparatus 100 or may be a memory such as a USB (Universal Serial Bus) memory that is freely attachable and detachable to and from the imaging apparatus 100. Further, the imaging apparatus 100 may include a communication apparatus. Using the communication apparatus, the imaging apparatus 100 may be capable of transmitting and receiving image data, various setting data, and the like to and from an external apparatus through the Internet and the like. The communication may be performed wiredly or wirelessly.

"Example of Configuration of Digital Signal Processing Section"

Figure 2:
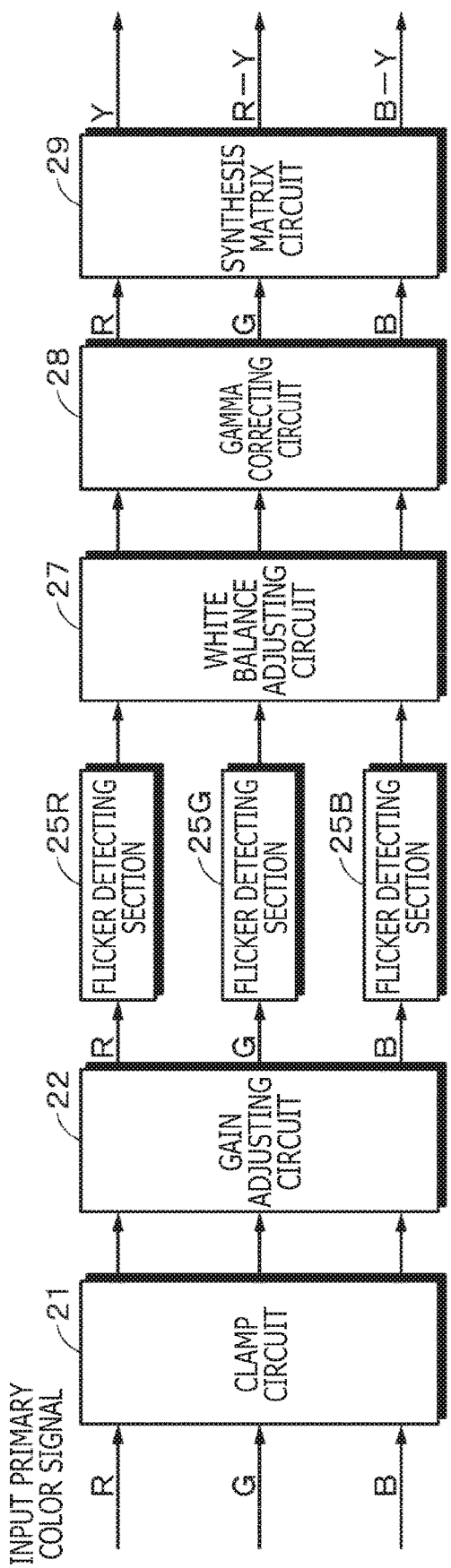
FIG. 2 is a block diagram depicting an example of a configuration of a digital signal processing section according to the one embodiment of the present disclosure.

FIG. 2 depicts an example of a configuration of the digital signal processing section 20 in case of the primary color system. In the primary color system, the imaging optical system 11 in FIG. 1 includes a separation optical system. The separation optical system separates light from an object into color light of each of RGB colors. The primary color system is either a three-plate system or a one-plate system. The three-plate system includes, as the CMOS imaging device 12, a CMOS imaging device for each of the RGB colors. The one-plate system includes, as the CMOS imaging device 12, a single CMOS imaging device in which a color filter of each of the RGB colors is sequentially and repeatedly arranged in each pixel on a light incident surface in the horizontal direction of the screen. In this case, the primary color signals of the respective RGB colors are read in parallel from the CMOS imaging device 12.

In the digital signal processing section 20 in FIG. 2, a clamp circuit 21 clamps the black levels of the input RGB primary color signals to a predetermined level. A gain adjusting circuit 22 adjusts gain of the clamped RGB primary color signals according to the amount of exposure. Using a method described later, flicker detecting sections 25R, 25G, and 25B detect flicker components in the RGB primary color signals after the gain has been adjusted, and reduce the flicker components appropriately. Further, a process for performing flickerless photographing according to the control by the system controller 14 is performed at the time of actual photographing. The actual photographing refers to photographing that is performed in response to a predetermined operation (for example, an operation of fully pressing a shutter button), for example, photographing that records an image in a storage medium. Further, the flickerless photographing refers to photographing that can prevent the influence on the image quality (the deterioration of the image quality) due to a flicker generated by the flicker light source.

In addition, in the digital signal processing section 20 in FIG. 2, a white balance adjusting circuit 27 adjusts the white balance of the RGB primary color signals after the flicker has been reduced. A gamma correcting circuit 28 converts the grayscale of the RGB primary color signals after the white balance has been adjusted. From the RGB primary color signals after the gamma has been corrected, a synthesis matrix circuit 29 generates the luminance signal Y and the color difference signals R−Y and B−Y to be output.

It is noted that the flicker detecting section 25 may be provided on the output side of the synthesis matrix circuit 29. From the output side of the synthesis matrix circuit 29, the luminance signal Y is output. This allows a flicker component in the luminance signal Y to be detected.

By contrast, the complementary color system is a one-plate system. The one-plate system includes, as the CMOS imaging device 12 in FIG. 1, a single CMOS imaging device in which color filters of the complementary color system are formed on a light incident surface.

In the complementary color system, the CMOS imaging device 12 synthesizes and reads video signals at adjacent two horizontal line positions. In the digital signal processing section 20, the black levels of the complementary color signals (synthesized signals) are clamped to a predetermined level. The gain of the clamped complementary color signals is adjusted according to the amount of exposure. In addition, a luminance signal and RGB primary color signals are generated from the complementary color signals after the gain has been adjusted.

Then, the grayscale of the luminance signal is corrected and the luminance signal Y to be output is obtained. The white balance of the RGB primary color signals is also adjusted. The grayscale of the RGB primary color signals after the white balance has been adjusted is converted and the color difference signals R−Y and B−Y are generated from the RGB primary color signals after the gamma has been corrected.

[Example of Actions]

"Basic Actions"

Next, an example of actions of the imaging apparatus 100 will be described. Here, an example of still image photographing will be described. When the imaging apparatus 100 is powered on, an image (through image) in a moving image mode is displayed (live view display) on the display section 18b at the time of, for example, determination (framing) of the composition of an object before photographing.

Subsequently, after the object has been determined, a preparation operation is performed. The preparation operation is an operation that prepares for photographing and that is performed immediately before photographing. The preparation operation is, for example, a half-press operation that presses the shutter button part way (approximately until halfway through). The shutter button is included in the operating section 18a. When the half-press operation is performed on the shutter button, preparation actions for imaging a still image of an object are performed, for example. Examples of the preparation actions for imaging a still image of an object include a setting of an exposure control value, a detection action for detecting the focus, light emission of an auxiliary light section, and the like. It is noted that when the pressing of the shutter button is canceled in the half-press state, these preparation actions end.

When the shutter button is pressed further from the half-press state and fully pressed, the imaging apparatus 100 is instructed to perform the actual photographing and uses the CMOS imaging device 12 to perform an exposure action associated with an object image (optical image of the object). After the analog signal processing section 13 and the digital signal processing section 20 perform predetermined signal processes on the image data obtained from the exposure action, a still image can be obtained. The image data corresponding to the obtained still image is appropriately stored in a storage apparatus, not illustrated.

It is noted that the imaging apparatus 100 may capture a moving image. In a case where the imaging apparatus 100 captures a moving image, the imaging apparatus 100 captures and records the moving image when the shutter button is pressed, and stops capturing the moving image when the shutter button is pressed again, for example.

"About Flicker Reduction Process"

Next, a flicker reduction process and the like of the imaging apparatus 100 will be described. The flicker reduction process is, for example, a process to be performed on a through image in the live view display. Before description, an example of a flicker component will be described to facilitate understanding. The flicker component is generated by a fluorescent lamp in an NTSC system. It is noted that in this example, description will be made with regard to a case where the frame rate is 60 fps (frames per second) and the commercial power supply frequency is 50 hertz (Hz). The characteristics of the flicker component generated in this case are as follows.

(1) A flicker component for 5/3 cycles is generated in one screen (repetition cycle is three frames (or may be fields)).

(2) A phase changes for each line.

(3) The flicker component can be handled as a sine wave having a frequency (100 Hz) which is twice the frequency of the commercial power supply frequency (50 Hz).

Figure 3:
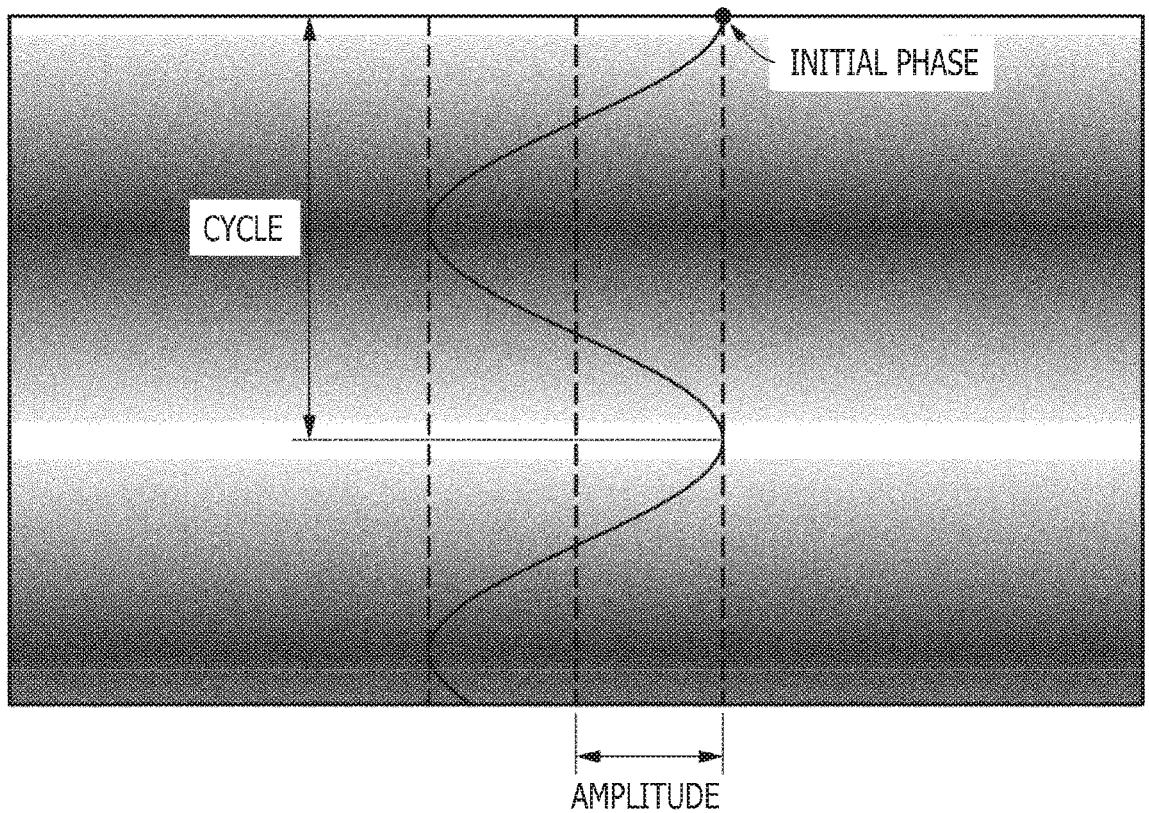
FIG. 3 is a diagram depicting an example of a flicker component.

When a flicker phenomenon occurs, a flicker component as depicted in FIG. 3 is generated due to the characteristics described above. It is noted that in FIG. 3, scanning is performed from the upper side (upper portion of the screen) to the lower side (lower portion of the screen). In the CMOS imaging device 12, the exposure timing is different at each horizontal line. Therefore, the amount of receiving light changes depending on the horizontal lines. Accordingly, even if the fluorescent lamp lights up spatially and uniformly, a horizontal line at which the value of the video signal is higher than the average value and a horizontal line at which the value of the video signal is lower than the average value exist, as in FIG. 3. For example, in the frame in FIG. 3, the uppermost horizontal line in the image, that is, the top line, is the peak at which the flicker component (amplitude of the flicker component) is highest. In addition, the flicker component is also highest at a horizontal line that is shifted from the top line and that corresponds to ⅗ of the number of total lines included in one screen. In this manner, the flicker component can be expressed as a sin function (sine wave) having the amplitude, cycle, and initial phase as depicted in FIG. 3. It is noted that the initial phase in this example refers to the phase at the top line.

In addition, the phase of each horizontal line changes depending on the frames. That is, the horizontal line at which the value of the video signal is higher than the average value and the horizontal line at which the value of the video signal is lower than the average value change in each frame. In the next frame, the sine wave has a different initial phase. For example, in a case where a flicker of 100 Hz is generated by the fluorescent lamp and the frame rate is 60 fps, five cycles of the flicker of the fluorescent lamp are a period of time corresponding to three frames. Therefore, the initial phase becomes the same every three frames. In this manner, the flicker component fluctuates depending on the horizontal lines and the frames. It is noted that in case of a PAL method, that is, in a case where the frame rate is 50 fps and the commercial power supply frequency is 60 Hz, it is possible to express the flicker component as a sine wave having a cycle of five frames.

Description will be made with regard to an example of processes (actions) of detecting and reducing the flicker component having the property as described above.

Figure 4:
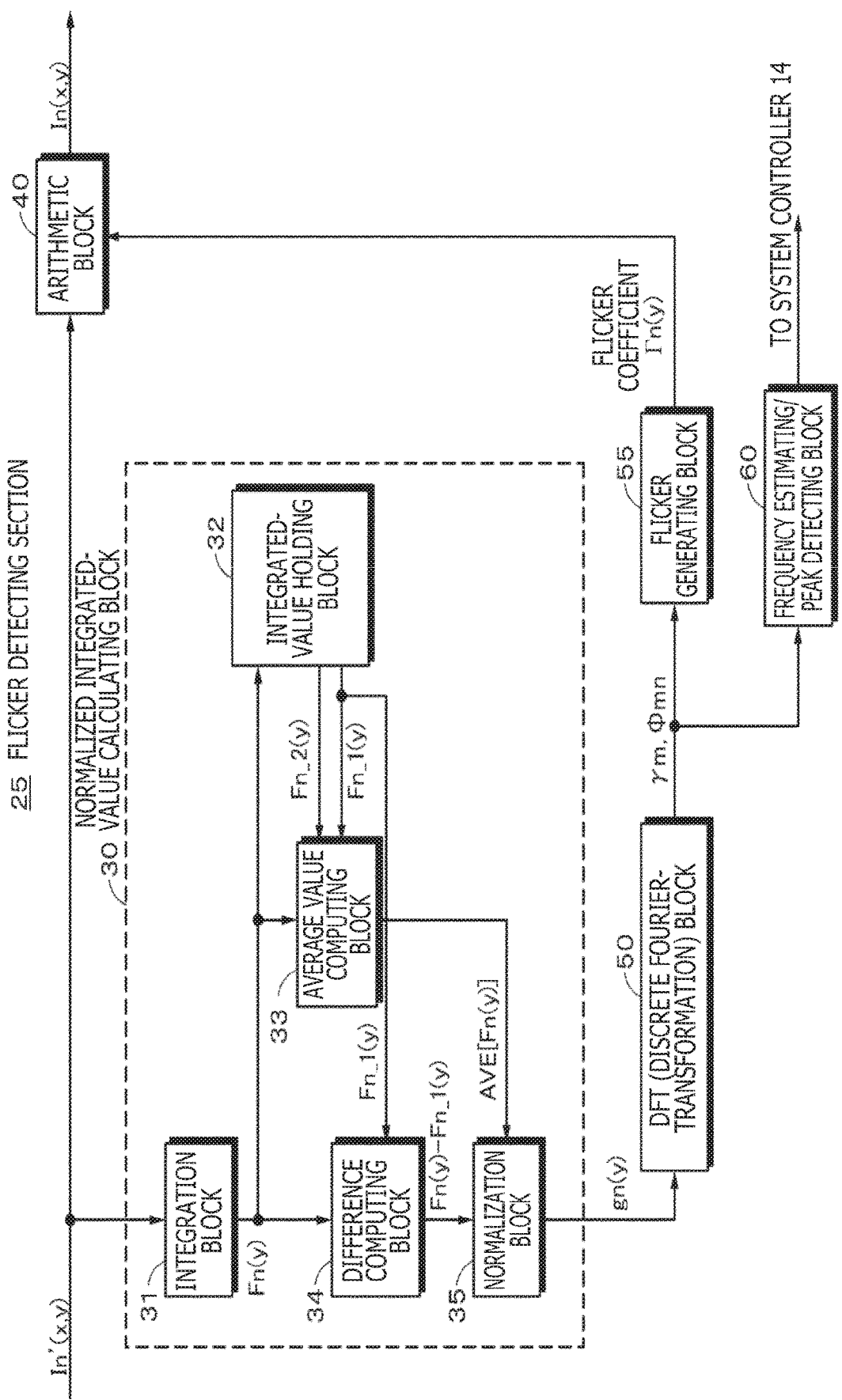
FIG. 4 is a block diagram depicting an example of a configuration of a flicker detecting section according to the embodiment of the present disclosure.

FIG. 4 depicts a detailed example of a configuration of the flicker detecting section 25. It is noted that in the following description, each of input image signals refers to an RGB primary color signal or a luminance signal input into the flicker detecting section 25 before the flicker reduction process. Each of output image signals refers to an RGB primary color signal or a luminance signal whose flicker component detected by the flicker detecting section 25 has been reduced.

The flicker detecting section 25 includes a normalized integrated-value calculating block 30, an arithmetic block 40, a DFT (discrete Fourier-transformation) block 50, a flicker generating block 55, and a frequency estimating/peak detecting block 60, for example. The normalized integrated-value calculating block 30 includes an integration block 31, an integrated-value holding block 32, an average value computing block 33, a difference computing block 34, and a normalization block 35.

The integration block 31 integrates an input image signal In' (x, y) over one line in the horizontal direction of the screen to calculate an integrated value Fn(y). The calculated integrated value Fn(y) is stored and held by the integrated-value holding block 32 to detect the flicker in later frames. In a case where a vertical synchronization frequency is 60 Hz, the integrated-value holding block 32 is configured to be capable of holding integrated values for at least two frames.

The average value computing block 33 calculates an average value AVE[Fn(y)] of three integrated values Fn(y), $Fn\_1(y)$, and $Fn\_2(y)$. It is noted that $Fn\_1(y)$ is an integrated value $Fn\_1(y)$ in the same line as one frame before, and $Fn\_2(y)$ is an integrated value $Fn\_2(y)$ in the same line as two frames before. These integrated values are values read from the integrated-value holding block 32.

The difference computing block 34 calculates a difference between the integrated value Fn(y) that has been supplied from the integration block 31 and the integrated value $Fn\_1(y)$ one frame before that has been supplied from the integrated-value holding block 32. With a difference value $Fn(y)-Fn\_1(y)$, the influence of the object is sufficiently removed. Therefore, the state of the flicker component (flicker coefficient) clearly appears as compared with the integrated value Fn(y).

In addition, the normalization block 35 performs a normalization process to calculate a normalized difference value gn(y). In the normalization process, the normalization block 35 divides the difference value $Fn(y)-Fn\_1(y)$ obtained from the difference computing block 34 by the average value AVE[Fn(y)] obtained from the average value computing block 33.

The DFT block 50 performs discrete Fourier-transformation on data of the normalized difference value gn(y) obtained from the normalization block 35. The data corresponds to one wavelength (L lines) of the flicker. As a result, an amplitude γ m and an initial phase Φ mn of each subsequent flicker component are estimated. It is noted that the initial phase Φ mn is held in association with a counter for each predetermined time generated in the imaging apparatus 100 (for example, for each 0.5 μs (microseconds)).

In addition, the flicker generating block 55 calculates a flicker coefficient Fn(y) from the estimated values γ m and @ mn obtained from the DFT block 50. Then, the arithmetic block 40 performs inverse gain processes of adding 1 to the flicker coefficient Fn(y) obtained from the flicker generating block 53 and dividing the input image signal In' (x, y) by the resultant sum [1+Γn(y)]. As a result, the flicker component included in the input image signal In' (x, y) is almost completely removed. As the output image signal (the RGB primary color signal or the luminance signal after the flicker reduction process), a signal component In (x, y) that does not substantially include the flicker component can be obtained from the arithmetic block 40.

Through the processes as described above, it is possible to detect the presence or absence of the flicker and prevent the deterioration of the image quality of the through image due to the flicker. It is noted that the above-described flicker reduction process may be performed at the time of capturing (including recording) of a moving image. It is noted that in this embodiment, the flicker component is detected for each RGB. In this case, the timing of the peak of the color component (channel) having the maximum amplitude is detected. Alternatively, the peak of the luminance signal may be detected.

It is noted that the initial phase Φ mn computed by the DFT block 50 is supplied to the frequency estimating/peak detecting block 60. The frequency estimating/peak detecting block 60 estimates at least the frequency of the flicker component (light source), in other words, the cycle of the flicker component on the basis of the input initial phase Φ mn. In addition, the frequency estimating/peak detecting block 60 detects the timing of the peak of the flicker component (hereinafter appropriately referred to as a peak position). For example, the frequency estimating/peak detecting block 60 estimates the frequency of the flicker component from a time difference based on the frame rate and a phase difference from the initial phase Φ mn. In addition, the frequency estimating/peak detecting block 60 detects timing of the peak and the bottom of the flicker component from the initial phase Φ mn in the first frame and the counter associated with the initial phase Φ mn, for example.

For example, in a case where the initial phase Φ mn is at 60 degrees, the timing of the peak of the flicker component (for example, 90 degrees) that can be approximated by a sine wave can be obtained using the time interval of the counter. The information obtained from the frequency estimating/peak detecting block 60 is notified to the system controller 14. It is noted that the peak of the flicker component (the crest of the flicker component) is the brightest portion of the blinking flicker, as described above. Further, the bottom of the flicker component (the trough of the flicker component) is the darkest portion of the blinking flicker.

As described above, the characteristics of the flicker component (the cycle of the flicker component, the timing of the peak, and the like) can be detected on the basis of the result of imaging using the CMOS imaging device 12 (the photographed image obtained through the imaging section). Therefore, it is not necessary to provide any dedicated sensor, and therefore it is possible to prevent cost increase due to an increase in the number of parts. Further, downsizing of the imaging apparatus is also possible. It is noted that, however, a dedicated photometric sensor may be provided in this embodiment. It is noted that the process of obtaining the characteristics of the flicker component is not limited to the method described above and a known method can be applied.

"About Flickerless Photographing Process"

Next, the flickerless photographing process will be described. The flickerless photographing process is executed in a case where a flickerless photographing mode has been set in the imaging apparatus 100, for example.

In the above-described process of detecting and reducing the flicker component, images of a plurality of frames (for example, three frames) are used to extract a background component from the average. Therefore, in a case where the frame rate matches the blinking cycle of the flicker light source such as a fluorescent lamp, it is difficult to separate the background and the flicker. This results in difficulty in detecting the flicker. Further, since images of a plurality of frames are used, it is difficult to apply the above-described process without any change in case of performing the flickerless photographing of a still image. Accordingly, in case of the flickerless photographing of a still image, the flickerless photographing process described below will be executed.

A process for switching the frame rate to a higher frame rate than the frame rate in normal times is executed first. The switched frame rate is N times the frequency of the light source (it is noted that, however, the frequency is greater than the frequency of the flicker component (100 Hz or 120 Hz)), for example. It is preferable that a frame includes one cycle of the flicker component. As an example, the frame rate is set to N=4, that is, 200 fps (in a case where the frequency of the light source is 50 Hz) or 240 fps (in a case where the frequency of the light source is 60 Hz).

It is noted that the frequency of the flicker light source may be obtained from the user setting or may be set automatically on the basis of the result of the above-described flicker reduction process in the live view display. That is, in the flicker reduction process, in a case where the frame rate is 60 fps and the flicker component is not detected, the frequency of the light source is determined as 50 Hz. In a case where the frame rate is 50 fps and the flicker component is not detected, the frequency of the light source is determined as 60 Hz. The results may be used during the flickerless photographing process. Further, the presence or absence of the flicker may be detected through the flickerless photographing process.

Although the frame rate switching timing can be set appropriately, it is preferable that the frame rate is switched immediately before the actual photographing. For example, the frame rate is switched when the half-press operation is performed on the shutter button, which is the preparation operation of the actual photographing. More specifically, an operation signal in response to the half-press operation performed on the shutter button is supplied to the system controller 14 through the interface 19. The system controller 14 drives the CMOS imaging device 12 by controlling the timing generator 16, thereby increasing the frame rate.

When the frame rate increases, the repetition cycle of the flicker component changes. For example, in a case where the frame rate is 200 fps, the repetition cycle of the flicker component is 20 frames. In a case where the frame rate is 240 fps, the repetition cycle of the flicker component is 12 frames.

Image data can be obtained on the basis of the increased frame rate. The obtained image data is input into the digital signal processing section 20 after the process by the analog signal processing section 13. The flicker detecting section 25 similarly performs the above-described flicker reduction process on the image data obtained at the high frame rate. In addition, in this process, the initial phase Φ mn, which is output from the DFT block 50, is input into the frequency estimating/peak detecting block 60 of the flicker detecting section 25.

The frequency estimating/peak detecting block 60 estimates at least the frequency (cycle) of the flicker component (light source) on the basis of the input initial phase Φ mn. In addition, the frequency estimating/peak detecting block 60 detects the timing of the peak of the flicker component.

Figure 5:
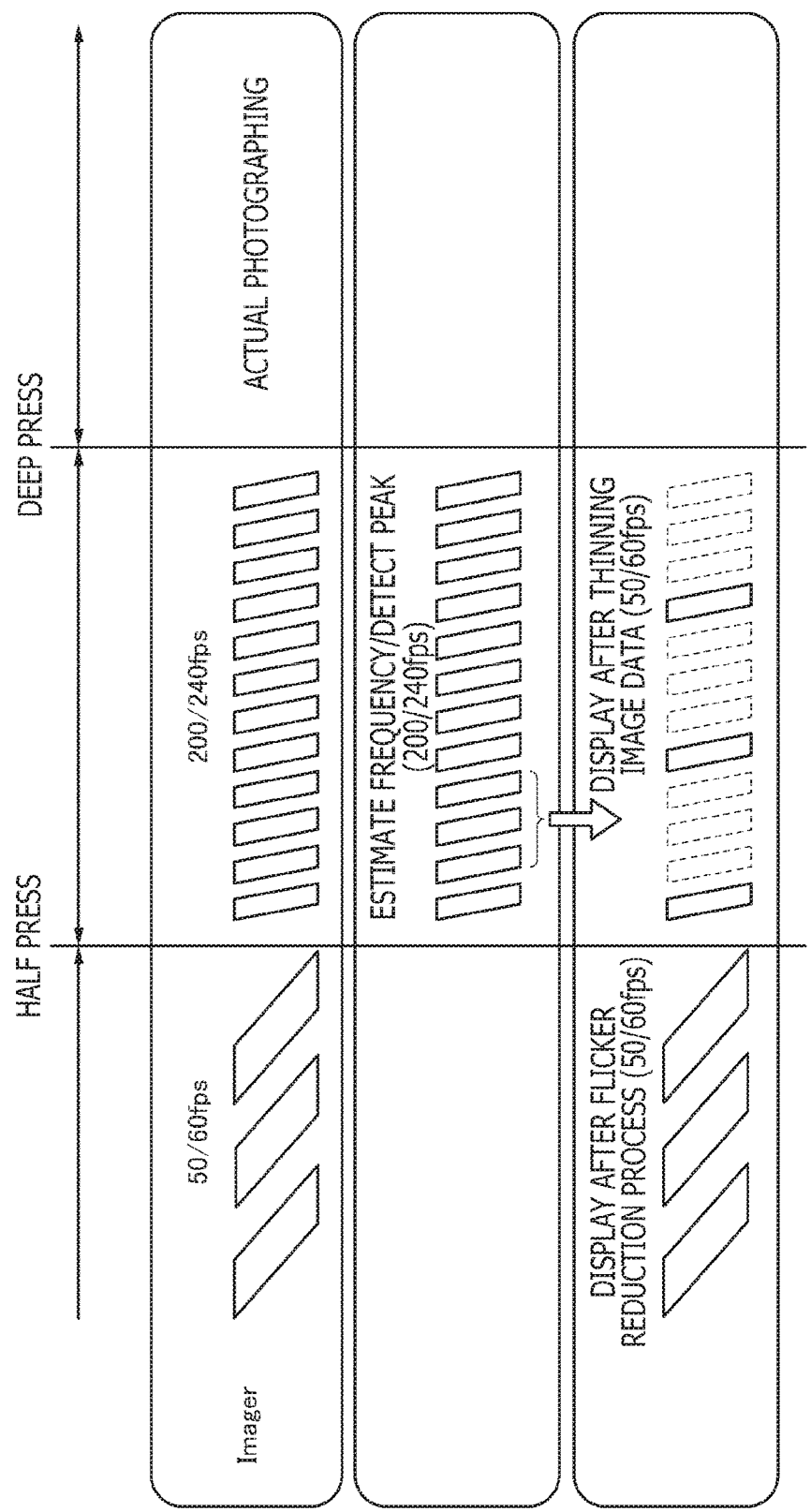
FIG. 5 is a diagram of assistance in explaining an example of actions of the imaging apparatus according to the embodiment of the present disclosure.

FIG. 5 is a diagram summarizing the above-described processes. The flicker reduction process is performed on an image obtained at a normal frame rate (for example, 50 or 60 fps). The image on which the flicker reduction process has been performed is displayed on the display section 18b as a through image. Then, when the shutter button is half-pressed, the frame rate is switched to high speed (for example, 200 or 240 fps) and the frequency estimation and the peak detection process are performed together with the flicker reduction process. Then, the image on which the flicker reduction process has been performed is displayed on the display section 18b. It is noted that the image displayed on the display section 18b is based on the image data that has been partially thinned from the obtained image data from a viewpoint of reducing the band of the data in the display system, consumption power, and the like. Then, when the shutter button is deeply pressed, actual photographing is performed.

Figure 6:
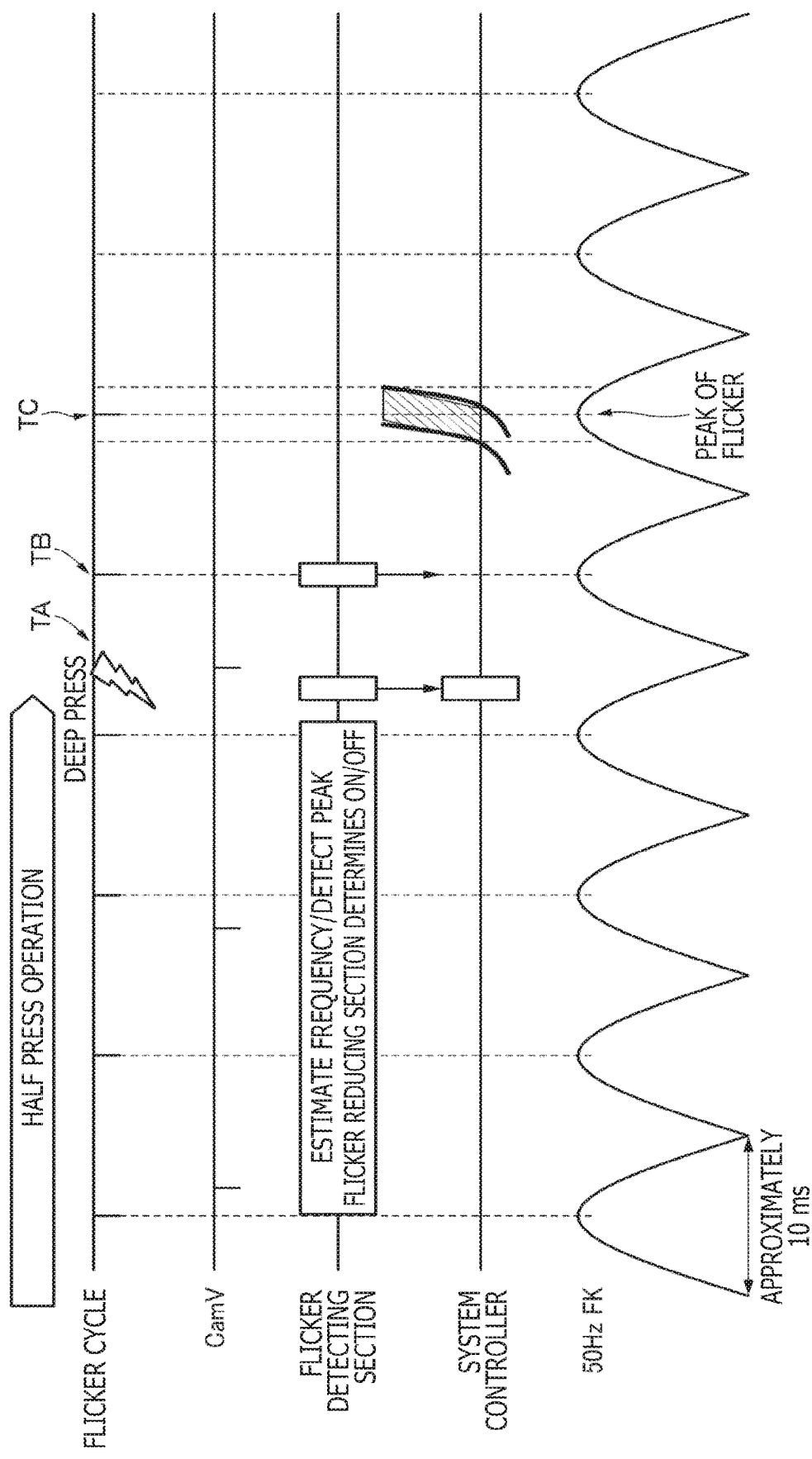
FIG. 6 is a diagram of assistance in explaining an example of a flickerless photographing process.

FIG. 6 is a diagram of assistance in explaining the process during photographing in response to the deep-press operation performed on the shutter button. As described above, when the half-press operation is performed on the shutter button, the frequency of the flicker component is estimated and the peak timing detection process is performed. This process is repeatedly executed during the half-press operation. It is noted that whether or not the mode for performing the flickerless photographing has been set (whether the mode has been set to on) is determined during the half-press operation. Here, in a case where the mode for performing the flickerless photographing has been set, a process described below is executed.

In FIG. 6, for example, the deep-press operation is assumed to be performed on the shutter button at timing TA. In response to the deep-press operation, the flicker detecting section 25 notifies the system controller 14 (the shutter controlling section 14c) of the timing of the next peak of the flicker component (in this example, TB). It is noted that the timing of the peak here refers to the timing that has been obtained immediately before the deep-press operation, for example.

The system controller 14 executes photographing in which the exposure timing is synchronized with the timing of the peak of the flicker component. It is noted that in the example depicted in FIG. 6, the timing closest to the peak of the flicker component is at the timing TB. In this example, the exposure timing is temporally synchronized with the timing (for example, timing TC) later than the timing TB for a multiple of the cycle of the flicker component in consideration of delays and the like of the process associated with the still image photographing. It is noted that, however, the exposure timing may be synchronized with the timing TB as long as the process makes it in time.

The photographing in which the exposure timing is synchronized with the timing of the peak of the flicker component refers to photographing that includes the peak of the flicker component within the exposure time, for example. More specifically, the center of the exposure time and the center of the curtain speed match or substantially match the peak of the flicker component. The term "substantially match" means that the shift of the timing is within a predetermined error range. As a result, in FIG. 6, the gravity (exposure gravity) of a shaded quadrangle matches or substantially matches the peak of the flicker component. The shaded quadrangle indicates the amount of exposure. Since the exposure timing is always synchronized with the peak of the flicker component, it is possible to realize the flickerless photographing that prevents the deterioration of the image quality of the image due to the flicker component.

"Flow of Process"

Figure 7:
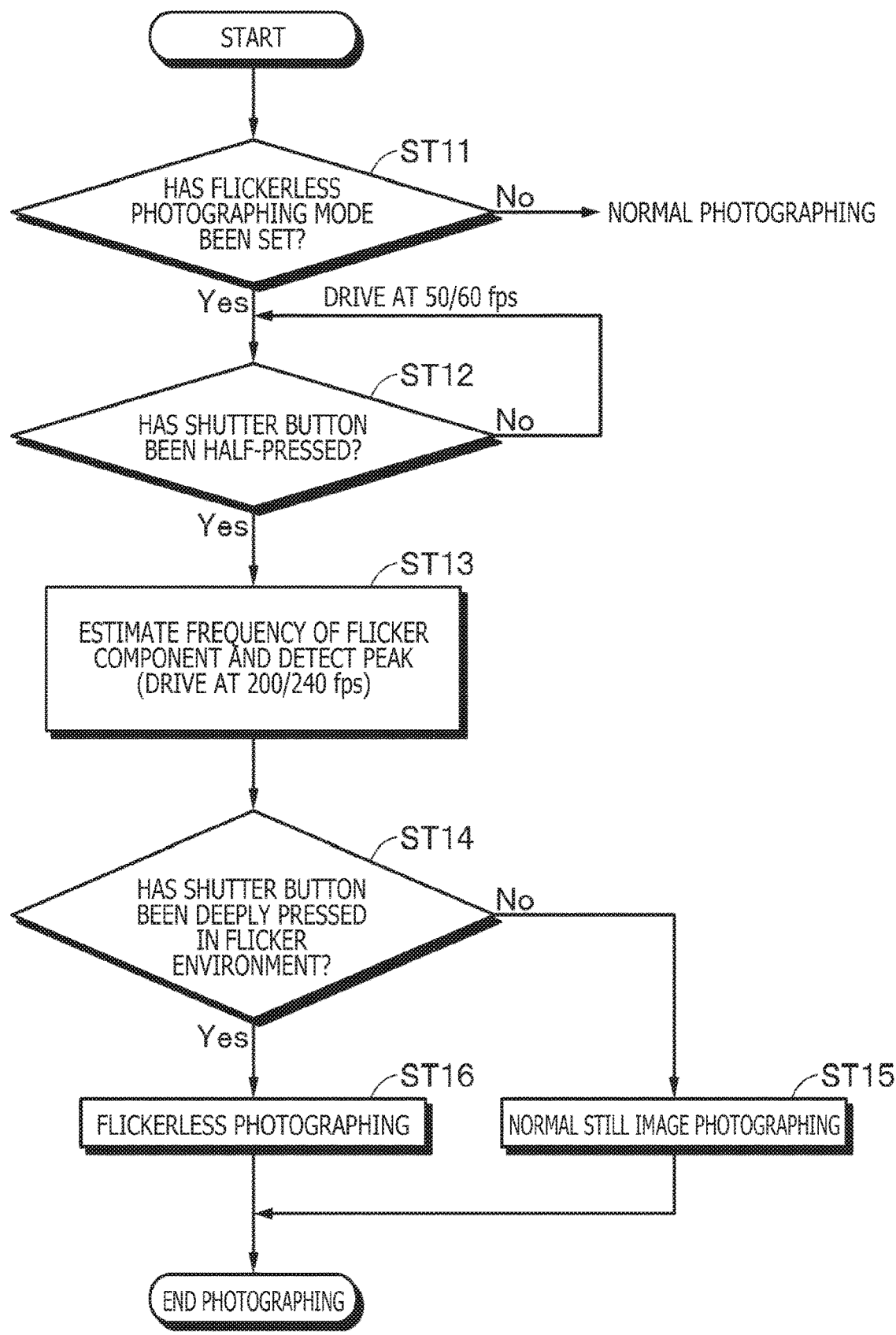
FIG. 7 is a flowchart illustrating an example of a flow of a process according to the one embodiment of the present disclosure.

FIG. 7 is a flowchart illustrating an example of a flow of the process in the flickerless photographing. In step ST11, the system controller 14 determines whether or not the mode for performing the flickerless photographing (flickerless photographing mode) has been set. Here, in a case where the system controller 14 has determined that the flickerless photographing mode has not been set, a process associated with normal photographing (here, the normal photographing refers to photographing without the flickerless photographing process) is executed in the later process. In step ST11, in a case where the system controller 14 has determined that the flickerless photographing mode has been set, the process proceeds to step ST12.

In step ST12, it is determined whether or not the shutter button included in the operating section 18a has been half-pressed. In a case where the shutter button has not been half-pressed, the flicker reduction process is performed on an image obtained at a normal frame rate (for example, 50 or 60 fps). The image on which the flicker reduction process has been executed is displayed on the display section 18b as a through image. It is noted that in a case where the flicker does not occur in outdoor photographing or the like and the flicker component is not detected when the flicker reduction process is executed, the flicker reduction process is not executed. In a case where the shutter button is half-pressed, the process proceeds to step ST13.

In step ST13, the flickerless photographing process is executed in response to the half-press operation performed on the shutter button. Specifically, the CMOS imaging device 12 is driven at a high frame rate (for example, 200 or 240 fps). The frequency of the flicker component is estimated using the obtained image data, and the process of detecting the timing of the peak of the flicker component is executed. It is noted that in a case where the frequency of the flicker component is estimated through the flicker reduction process, only the process of detecting the timing of the peak of the flicker component may be executed. The data such as the timing that has been obtained is notified to the system controller 14. The process described above continues while the half-press operation continues, for example. Then, the process proceeds to step ST14.

In step ST14, it is determined whether or not the deep-press operation has been performed on the shutter button in a flicker environment in which a flicker occurs. In this determination, in a case where the deep-press operation has been performed on the shutter button in an environment in which the flicker does not occur, the process proceeds to step ST15. In step ST15, a still image photographing process that does not perform the flickerless photographing process is executed. By contrast, in a case where the deep-press operation has been performed on the shutter button in the environment in which the flicker occurs, the process proceeds to step ST16.

In step ST16, the flickerless photographing, which is one of the actual photographing, is performed. Specifically, the photographing in which the exposure timing is synchronized with the peak of the flicker component obtained through the process in step ST13 is performed. This enables photographing that prevents the deterioration of the image quality of the still image due to the flicker component. It is noted that in the flickerless photographing, as described later, the timing at which the exposure timing is synchronized can be at the bottom of the flicker component in some cases.

"Relationship Between Exposure Time of Image and Power Supply Cycle of Flicker Light Source"

Incidentally, it is possible that blinking of the flicker light source is inverted and identified depending on a relationship between the exposure time of the image and the cycle of the flicker light source. This point will be described.

Figure 8:
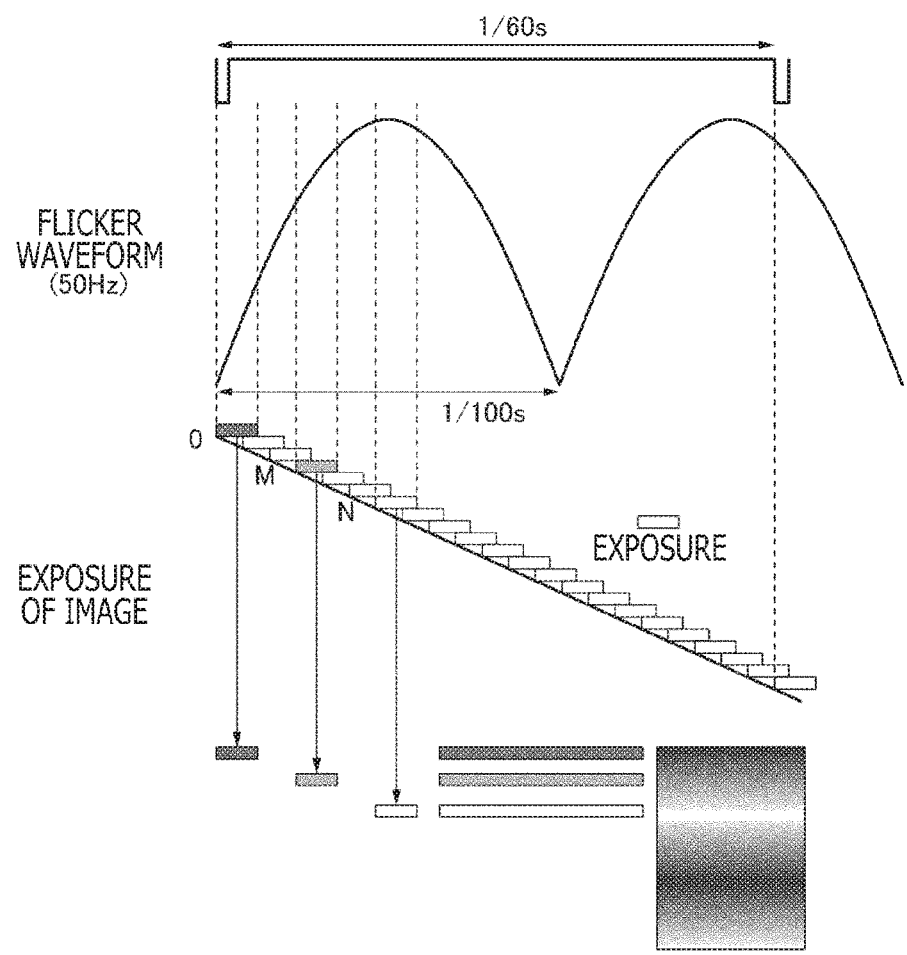
FIG. 8 is a diagram of assistance in explaining a relationship between exposure time of an image at the time of detection of the flicker component and a cycle of a flicker light source (an example of a case where the exposure time is shorter than the cycle of the flicker light source).
Figures 9, 10:
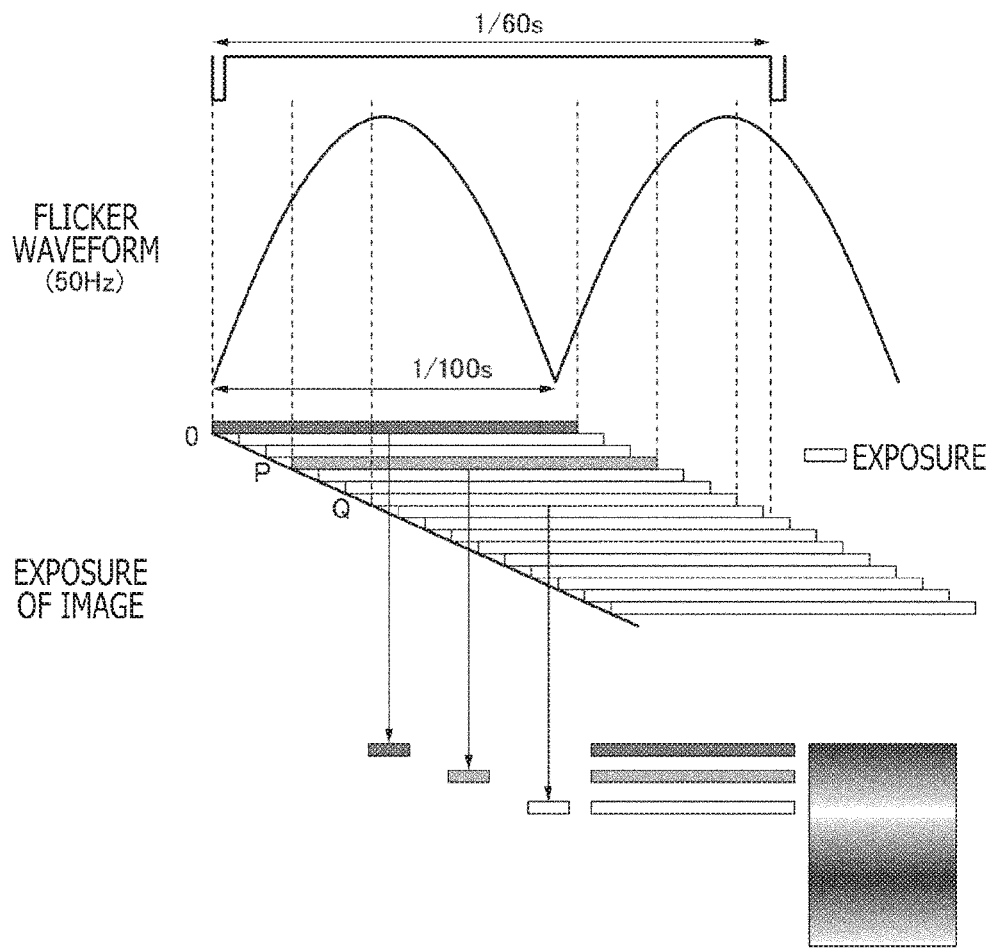
FIG. 9 is a diagram of assistance in explaining a relationship between the exposure time of the image at the time of detection of the flicker component and the cycle of the flicker light source (an example of a case where the exposure time is longer than the cycle of the flicker light source).
FIG. 10 is a diagram of assistance in explaining that a peak position of the flicker component is inverted according to the exposure time.

FIGS. 8 and 9 are diagrams of assistance in explaining the relationship between the exposure time of the image at the time of detection of the flicker component (at the time of wave detection) and the cycle of the flicker light source (power supply cycle).

FIG. 8 depicts an example of a case where the exposure time is shorter than the cycle of the flicker light source. In the example depicted in FIG. 8, the frequency of the flicker light source is 50 Hz (a cycle of $\frac{1}{100}$ second). As depicted in the figure, the image is darkest in the exposure at the bottom of the flicker waveform (the accumulation timing is at a line 0 in the CMOS imaging device 12). The image becomes slightly brighter in the exposure after a predetermined time has passed (the accumulation timing is at a line M in the CMOS imaging device 12). The image is brightest in the exposure at the peak of the flicker waveform (the accumulation timing is at a line N in the CMOS imaging device 12). That is, in a case where the exposure time is shorter than the cycle of the flicker light source, the portion identified as the peak position of the flicker light source corresponds to the brightest portion in the screen.

FIG. 9 depicts an example of a case where the exposure time is longer than the cycle of the flicker light source. In the example depicted in FIG. 9, the frequency of the flicker light source is also 50 Hz (a cycle of $\frac{1}{100}$ second). Further, the exposure time is slightly longer than the cycle of the flicker light source. As depicted in the figure, the image is darkest in the exposure whose center is at the peak of the flicker waveform (the accumulation timing is at a line 0 in the CMOS imaging device 12). The image becomes slightly brighter in the exposure after a predetermined time has passed (the accumulation timing is at a line P in the CMOS imaging device 12). The image is brightest in the exposure whose center is at the bottom of the flicker waveform (the accumulation timing is at a line Q in the CMOS imaging device 12). That is, in a case where the exposure time is longer than the cycle of the flicker light source, the peak position of blinking that appears in the image (the apparent peak position identified by the sensor section) corresponds to the actual darkest portion in the blinking of the light source. In this manner, each time the exposure time of the image crosses the cycle of the flicker light source, the light/dark characteristic of the identified flicker component (hereinafter appropriately abbreviated as the light/dark characteristic or simply abbreviated as the characteristic) is inverted.

FIG. 10 is a diagram illustrating the above description as a table. In a case where the shutter speed is higher than $\frac{1}{100}$ second, in other words, in a case where the flicker component corresponding to one cycle (a flicker waveform of $\frac{1}{100}$ second in this example) is not included (0) within the exposure time, the characteristic is not inverted. In a case where the shutter speed is lower than $\frac{1}{100}$ second and higher than $\frac{2}{100}$ second, in other words, in a case where one flicker component corresponding to one cycle is included within the exposure time, the characteristic is inverted. In a case where the shutter speed is lower than $\frac{2}{100}$ second and higher than $\frac{3}{100}$ second, in other words, in a case where two flicker components each corresponding to one cycle are included within the exposure time, the characteristic is not inverted.

In a case where the shutter speed is lower than $\frac{3}{100}$ second and higher than $\frac{4}{100}$ second, in other words, in a case where three flicker components each corresponding to one cycle are included within the exposure time, the characteristic is inverted. In a case where the shutter speed is lower than $\frac{4}{100}$ second and higher than $\frac{5}{100}$ second, in other words, in a case where four flicker components each corresponding to one cycle are included within the exposure time, the characteristic is not inverted. In a case where the shutter speed is lower than $\frac{5}{100}$ second and higher than $\frac{6}{100}$ second, in other words, in a case where five flicker components each corresponding to one cycle are included within the exposure time, the characteristic is inverted. In this manner, each time the cycle of the light source is crossed, the characteristic is inverted or not inverted. It is noted that in a case where the beginning of the exposure time matches the trough of a predetermined position of the flicker waveform having periodicity, the number of flicker components, each corresponding to one cycle, that are included within the above-described exposure time is defined by the number of flicker components, each corresponding to one cycle, that are included within the exposure time, for example.

The following formulas (1) and (2) are mathematical expressions of the description above. The following formula (1) is a mathematical expression for a case where an even number of flicker components (waveforms) each corresponding to one cycle are included within the exposure time at the time of detection of the flicker component. The following formula (2) is a mathematical expression for a case where an odd number of flicker components (waveforms) each corresponding to one cycle are included within the exposure time at the time of detection of the flicker component.

$$2m \times \text{the cycle of the light source} < \text{exposure time at the time of detection of the flicker component} < (2m+1) \times \text{the cycle of the light source} \quad \text{formula (1)}$$

(It is noted that m is an integer. The cycle of the light source is $\frac{1}{100}$ or $\frac{1}{120}$, for example.)

$$(2m+1) \times \text{the cycle of the light source} < \text{exposure time at the time of detection of the flicker component} < 2(m+1) \times \text{the cycle of the light source} \quad \text{formula (2)}$$

(It is noted that m is an integer. The cycle of the light source is $\frac{1}{100}$ or $\frac{1}{120}$, for example.)

In case of the above-described formula (2), the light/dark characteristic is inverted. Therefore, the frequency estimating/peak detecting block 60 of the flicker detecting section 25 inverts and outputs the phase of the detected flicker component. Inverting and outputting the phase means that the peak position of the detected flicker light source is shifted by π [rad] and output.

Figure 11:
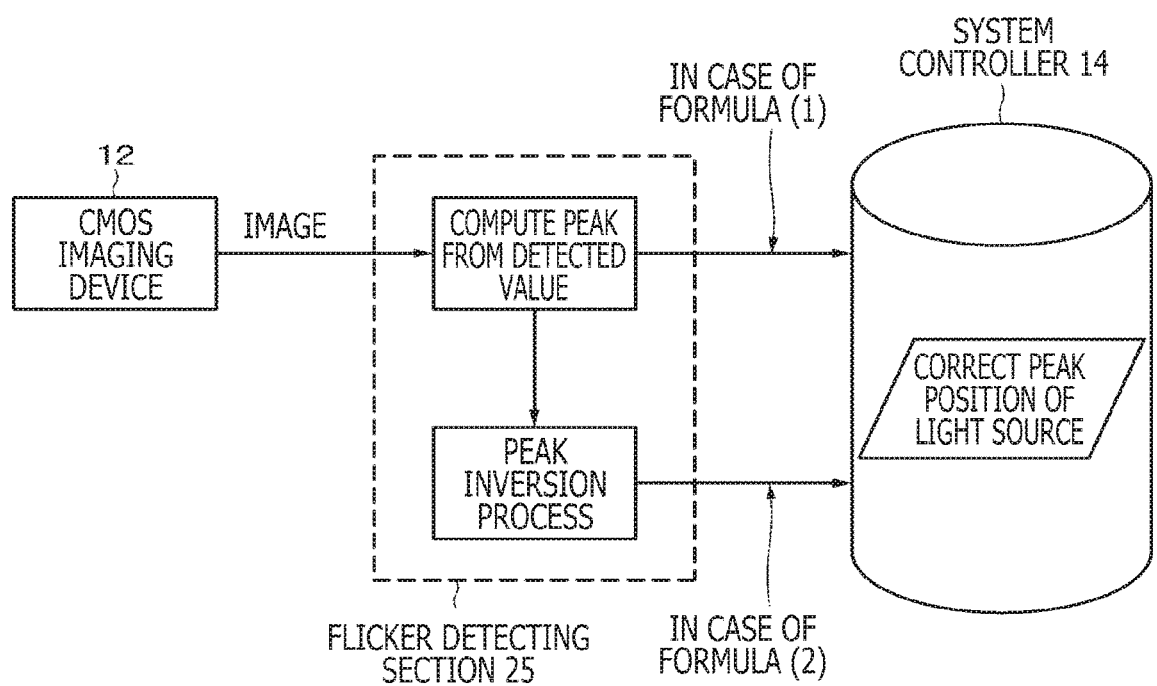

FIG. 11 is a diagram summarizing the above-described processes at the time of detection of the flicker component. After an appropriate signal process has been performed on the image output from the CMOS imaging device 12, the image is input into the flicker detecting section 25. The flicker detecting section 25 calculates the peak position of the flicker image included in the input image from a detected value of the input image. Since the examples of calculation of the peak position have been described above, redundant description will be omitted. In a case where the exposure time of the CMOS imaging device 12 is the formula (1), the peak position of the detected flicker component is output to the system controller 14 by the frequency estimating/peak detecting block 60 of the flicker detecting section 25.

Further, in a case where the exposure time of the CMOS imaging device 12 is the formula (2), the phase of the detected flicker component is inverted through the peak inversion process and output to the system controller 14 by the frequency estimating/peak detecting block 60 of the flicker detecting section 25. As a result, the system controller 14 stores the correct peak position of the flicker light source.

It is noted that the system controller 14 takes control such that the exposure time of the CMOS imaging device 12 at the time of detection of the flicker component is optimized to be the time suitable for detection of the flicker component, for example. The system controller 14 notifies the flicker detecting section 25 of the exposure time of the CMOS imaging device 12, so that the flicker detecting section 25 can obtain the exposure time at the time of detection of the flicker component. The flicker detecting section 25 may store the exposure time at the time of detection of the flicker component. The frequency estimating/peak detecting block 60 is capable of determining the cycle of the flicker component on the basis of the frequency of the flicker component.

It is noted that in a case where the exposure time matches the cycle of the flicker light source, it is known that the influence of the image quality due to the flicker component can be reduced. In this case, it is not necessary to consider the above-described inversion of the light/dark characteristic. Thus, it is not necessary to perform the above-described process.

Incidentally, the phenomenon in which the light/dark characteristic of the flicker component can be inverted and identified can occur not only at the time of detection of the flicker component but also at the time of actual photographing. Therefore, it is necessary to appropriately control the timing of the actual photographing. The following formulas (3) and (4) indicate similar things to the formulas (1) and (2), except that the exposure time at the time of detection of the flicker component is the exposure time at the time of actual photographing.

$$2m \times \text{the cycle of the light source} < \text{exposure time at the time of actual photographing} < (2m+1) \times \text{the cycle of the light source} \quad \text{formula (3)}$$

(It is noted that m is an integer. The cycle of the light source is $\frac{1}{100}$ or $\frac{1}{120}$, for example.)

$$(2m+1) \times \text{the cycle of the light source} < \text{exposure time at the time of actual photographing} < 2(m+1) \times \text{the cycle of the light source} \quad \text{formula (4)}$$

(It is noted that m is an integer. The cycle of the light source is $\frac{1}{100}$ or $\frac{1}{120}$, for example.)

In case of the formula (3), the peak position of the identified flicker component is not inverted. Therefore, the system controller 14 controls the timing of photographing such that the actual photographing is performed at the peak position of the flicker component supplied from the frequency estimating/peak detecting block 60. For example, the actual photographing is performed at the timing described with reference to FIG. 6.

Figure 12:
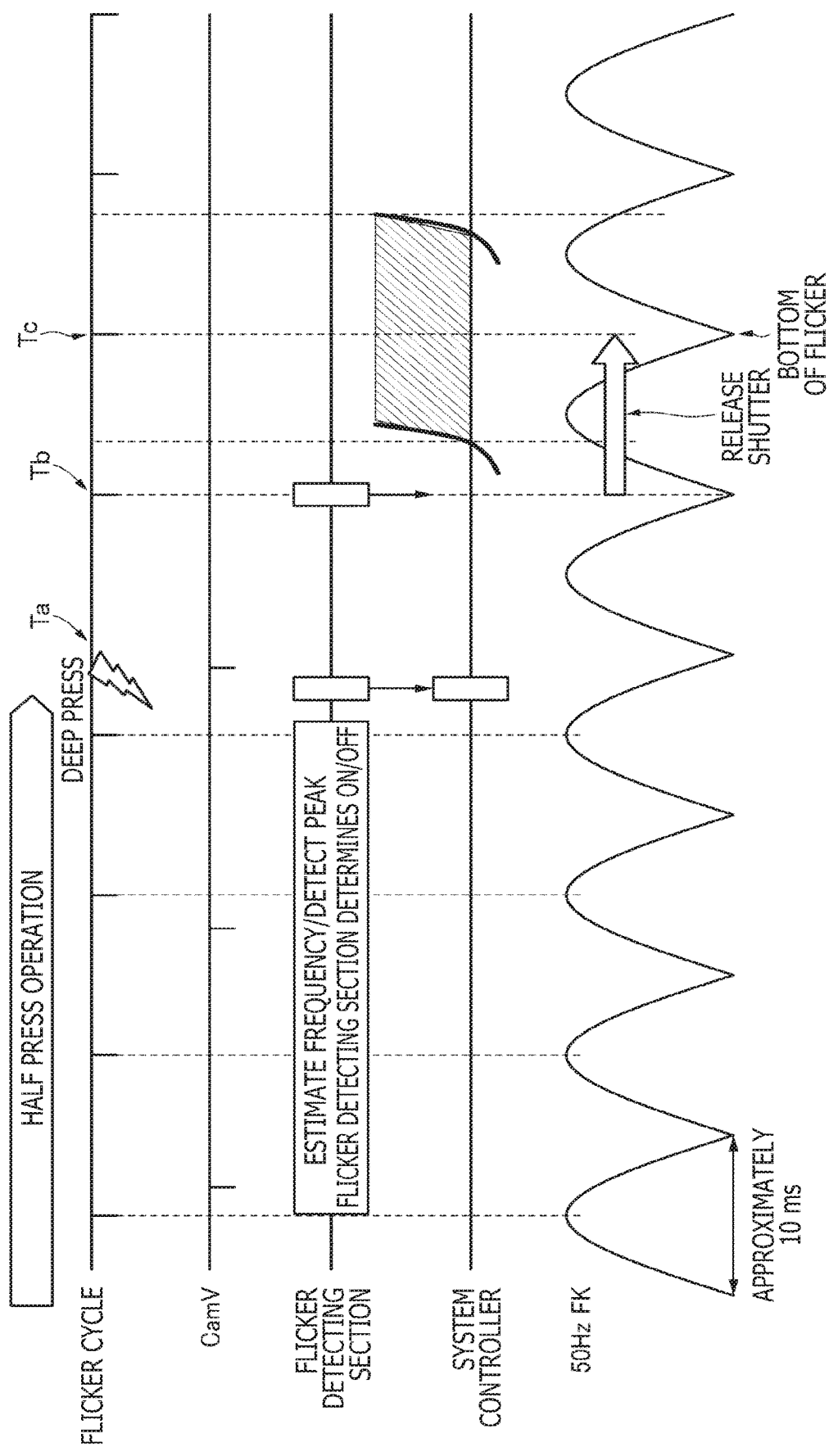
FIG. 12 is a diagram of assistance in explaining a control for synchronizing timing of photographing with a bottom of the flicker component.

In case of the formula (4), the peak position of the identified flicker component is inverted. Therefore, the timing of the actual photographing is shifted by 180 degrees from the peak position. Specific description will be made with reference to FIG. 12. In FIG. 12, for example, the deep-press operation is assumed to be performed on the shutter button at timing Ta. In response to the deep-press operation, the flicker detecting section 25 identifies the timing of the bottom of the flicker component. For example, the frequency estimating/peak detecting block 60 of the flicker detecting section 25 identifies the timing of the bottom of the flicker component on the basis of the initial phase of the flicker component. The flicker detecting section 25 notifies the system controller 14 of the timing of the bottom of the flicker component.

The system controller 14 executes photographing in which the exposure timing is synchronized with the timing of the bottom of the flicker component (in this example, timing Tb). It is noted that in the example depicted in FIG. 12, the exposure timing is synchronized with the temporally later timing (for example, timing Tc) than the timing Tb for a multiple of cycles of the flicker component in consideration of delays and the like of the process associated with the still image photographing. It is noted that, however, the exposure timing may be synchronized with the timing Tb as long as the process makes it in time.

Figure 13:
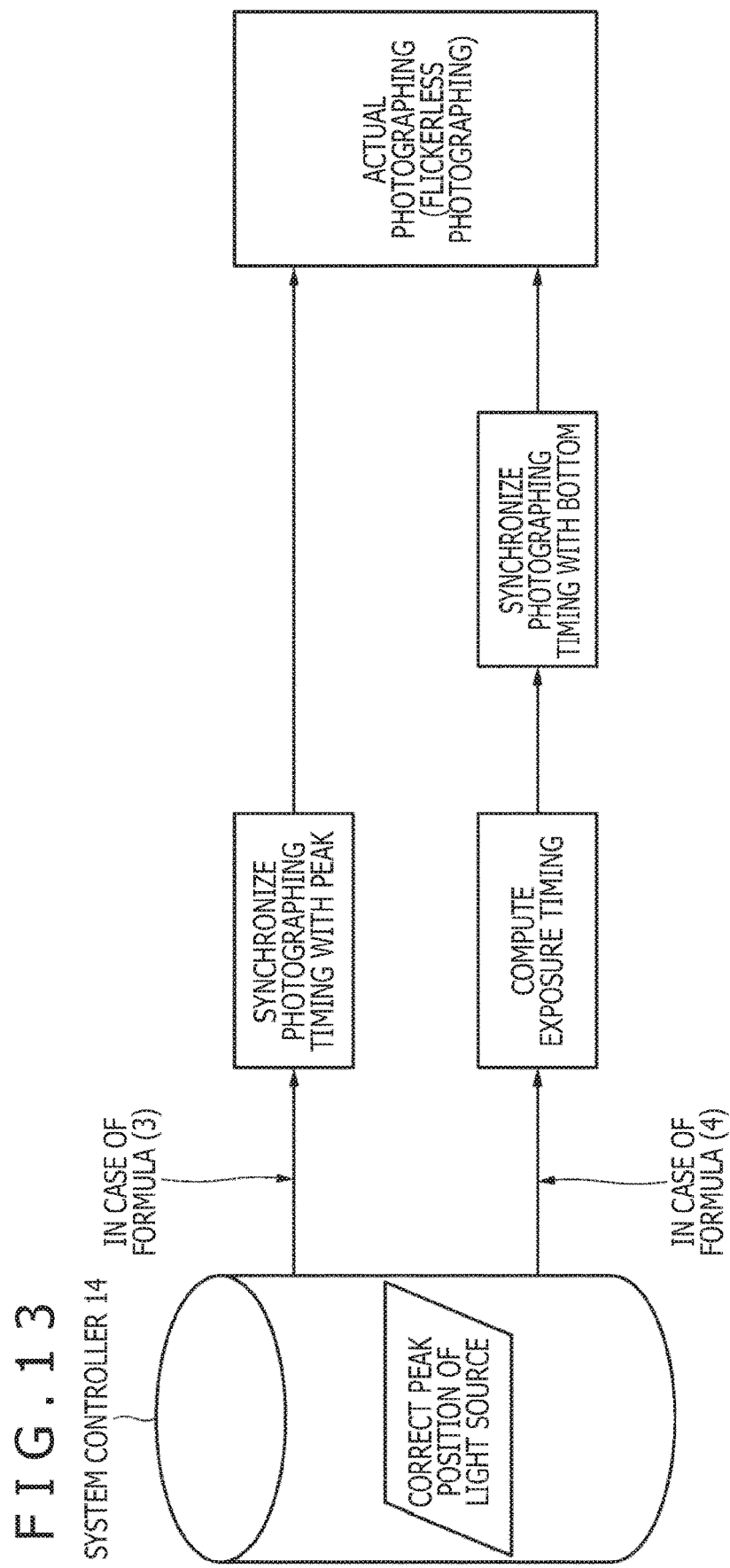

The photographing in which the exposure timing is synchronized with the timing of the bottom of the flicker component refers to photographing that includes the bottom of the flicker component within the exposure time, for example. More specifically, the center of the exposure time and the center of the curtain speed match or substantially match the timing of the bottom of the flicker component. The term "substantially match" means that the shift of the timing is within a predetermined error range. In this manner, in FIG. 12, the gravity (exposure gravity) of a shaded quadrangle matches or substantially matches the bottom of the flicker component. The shaded quadrangle indicates the amount of exposure. In practice, the bottom of the flicker component corresponds to the brightest portion of the flicker light source. That is, in case of the formula (4), the flickerless photographing can be realized by synchronizing the exposure timing with the bottom of the flicker component FIG. 13 is a diagram summarizing the above-described processes at the time of actual photographing. The flicker detecting section 25 supplies the correct peak position of the flicker light source to the system controller 14. From the cycle (reciprocal of the frequency) of the flicker component detected by the flicker detecting section 25 and the exposure time (shutter speed) at the time of actual photographing, the system controller 14 determines whether an even number or an odd number of flicker components each corresponding to one cycle are included within the exposure time, that is, the case of the above-described formula (3) or the case of the formula (4).

In case of the formula (3), the phase of the flicker component is not inverted. Therefore, the system controller 14 takes control to synchronize the exposure timing with the peak position of the flicker component detected by the flicker detecting section 25.

In case of the formula (4), the phase of the flicker component is inverted. Therefore, the system controller 14 takes control to synchronize the exposure timing with the bottom position of the flicker component. With this configuration, as a result, photographing can be performed at the brightest timing of the flicker light source.

FIG. 14 is a diagram illustrating the process for each pattern, patterning and illustrating the relationship between whether the peak position of the flicker component is inverted at the time of detection and the timing for synchronizing the timing of the actual photographing. Patterns 1 and 2 are patterns (corresponding to the above-described formula (1)) in which the phase of the flicker component is not inverted at the time of detection. In the patterns 1 and 2, the flicker detecting section 25 outputs, without any change, the phase of the detected flicker component. In case of the pattern 1 (corresponding to the above-described formula (3)), the phase of the flicker component is not inverted at the time of actual photographing. Therefore, the system controller 14 performs the actual photographing in which the exposure timing is synchronized with the peak position of the flicker component supplied from the flicker detecting section 25. In case of the pattern 2 (corresponding to the above-described formula (4)), the phase of the flicker component is inverted at the time of actual photographing. Therefore, the system controller 14 performs the actual photographing in which the exposure timing is synchronized with the bottom position of the flicker component supplied from the flicker detecting section 25.

Patterns 3 and 4 are patterns (corresponding to the above-described formula (2)) in which the phase of the flicker component is inverted at the time of detection. In the patterns 3 and 4, the flicker detecting section 25 inverts and outputs the phase of the detected flicker component. In case of the pattern 3 (corresponding to the above-described formula (3)), the phase of the flicker component is not inverted at the time of actual photographing. Therefore, the system controller 14 performs the actual photographing in which the exposure timing is synchronized with the peak position of the flicker component supplied from the flicker detecting section 25. In case of the pattern 4 (corresponding to the above-described formula (4)), the phase of the flicker component is inverted at the time of actual photographing. Therefore, the system controller 14 performs the actual photographing in which the exposure timing is synchronized with the bottom position of the flicker component supplied from the flicker detecting section 25. Through the processes described above, photographing can be performed at the brightest timing of the flicker light source in any of the patterns, and therefore the above-described flickerless photographing can be realized.

"About Exposure Time Adjustment Process"

The above-described phenomenon in which the characteristic of the flicker component is inverted can be avoided by adjusting the exposure time at the time of detection and at the time of actual photographing. This method will be described below.

The above-described formulas (1) to (4) are, for example, grouped as follows.

Group 1: An even number of flicker components each corresponding to one cycle are included within the exposure time (corresponding to the formulas (1) and (3)).

Group 2: An odd number of flicker components each corresponding to one cycle are included within the exposure time (corresponding to the formulas (2) and (4)).

Then, the system controller 14 adjusts the exposure time such that the exposure time at the time of detection and the exposure time at the time of actual photographing are identical or become the same group. It is noted that in the process of adjusting the exposure time, the flicker detecting section 25 does not correct (invert) the peak position of the flicker component and outputs the peak position of the flicker component without any change even in case of the formula (2).

In case of the group 1, the phase of the flicker component is not inverted at the time of detection and the phase of the flicker component is also not inverted at the time of actual photographing. Therefore, similarly to the process of the above-described pattern 1, photographing can be performed at the brightest timing of the flicker light source by performing the actual photographing in which the exposure timing is synchronized with the peak position of the flicker component output from the flicker detecting section 25.

In case of the group 2, the phase of the flicker component is inverted at the time of detection and the phase of the flicker component is also inverted at the time of actual photographing. In this case, a process similar to the above-described pattern 4 is performed. The output of the flicker detecting section 25 is not corrected. Therefore, although the apparent peak position of the flicker component output from the flicker detecting section 25 corresponds to the darkest portion of the flicker light source, the actual photographing is performed through the control in which the exposure timing is synchronized with the apparent bottom position of the flicker component, that is, the brightest portion of the flicker light source. As a result, the actual photographing can be performed at the brightest timing of the flicker light source. As described above, the exposure time at the time of detection of the flicker component and the exposure time at the time of actual photographing are adjusted. Therefore, it is possible to cope with the phenomenon in which the light/dark characteristic of the flicker component is inverted.

It is noted that the exposure time to be adjusted may be the exposure time at the time of detection of the flicker component, the exposure time at the time of actual photographing, or the exposure time at the time of both thereof. In a case where the exposure time cannot be adjusted at the time of actual photographing due to the setting of the mode, the above-described process of appropriately inverting the phase of the flicker component may be performed without performing the process of adjusting the exposure time.

3. Modification

It is noted that the present disclosure can also be configured as follows.

(1)

An imaging control apparatus including:

a flicker detecting section configured to detect a flicker component of a light source, the flicker component being included in an image; and a controlling section configured to control timing of imaging according to a detection result by the flicker detecting section, in which the controlling section controls the timing of the imaging according to timing of a peak or a bottom of the flicker component detected.

(2)

The imaging control apparatus according to (1), in which the controlling section controls the timing of the imaging according to exposure time of a sensor section during the imaging in addition to the timing of the peak or the bottom of the flicker component.

(3)

The imaging control apparatus according to (2), in which in a case where the exposure time of the sensor section does not match an integer multiple of a cycle of the flicker component and an odd number of the flicker components each corresponding to one cycle are included within the exposure time, the controlling section takes control such that the imaging is performed at the bottom of the flicker component detected, and in a case where the exposure time of the sensor section does not match the integer multiple of the cycle of the flicker component and an even number of the flicker components each corresponding to the one cycle are included within the exposure time, the controlling section takes control such that the imaging is performed at the peak of the flicker component detected.

(4)

The imaging control apparatus according to (2) or (3), in which the controlling section determines the exposure time of the sensor section on the basis of a mode that has been set.

(5)

The imaging control apparatus according to any one of (2) to (4), in which the peak or the bottom of the flicker component is included within the exposure time of the sensor section.

(6)

The imaging control apparatus according to any one of (1) to (5), in which the timing of the imaging is at timing of exposure.

(7)

The imaging control apparatus according to any one of (1) to (6), in which a sensor section includes an imaging device.

(8)

The imaging control apparatus according to any one of (1) to (7), further including:
an imaging section.

(9)

An imaging control apparatus including:
a flicker detecting section configured to detect a flicker component of a light source, the flicker component being included in an image,
in which the flicker detecting section outputs, according to exposure time of a sensor section at a time of the detection, information in which a phase of the flicker component detected is inverted.

(10)

The imaging control apparatus according to (9),
in which in a case where the exposure time of the sensor section does not match an integer multiple of a cycle of the flicker component and an odd number of the flicker components each corresponding to one cycle are included within the exposure time, the flicker detecting section outputs the information in which the phase of the flicker component detected is inverted, and
in a case where the exposure time of the sensor section does not match the integer multiple of the cycle of the flicker component and an even number of the flicker components each corresponding to the one cycle are included within the exposure time, the flicker detecting section outputs, without any change, the phase of the flicker component detected.

(11)

The imaging control apparatus according to (9) or (10), in which the sensor section includes an imaging device.

(12)

An imaging control apparatus including:
a controlling section configured to control first exposure time of a first sensor section at a time of detection of a flicker component and second exposure time of a second sensor section at a time of imaging,
in which the controlling section adjusts at least one of the first exposure time or the second exposure time so as to include, within each of the first exposure time and the second exposure time, an odd number or an even number of the flicker components each corresponding to one cycle and so as not to be an integer multiple of a cycle of the flicker component.

(13)

The imaging control apparatus according to (12),
in which in a case where the odd number of the flicker components each corresponding to the one cycle are included within the first exposure time, the controlling section adjusts the second exposure time so as to include the odd number of the flicker components each corresponding to the one cycle within the second exposure time, and
in a case where the even number of the flicker components each corresponding to the one cycle are included within the first exposure time, the controlling section adjusts the second exposure time so as to include the even number of the flicker components each corresponding to the one cycle within the second exposure time.

(14)

The imaging control apparatus according to (13), further including:
a flicker detecting section configured to detect the flicker component,
in which the flicker detecting section outputs, without any change, information regarding the flicker component detected.

(15)

The imaging control apparatus according to any one of (12) to (14), in which the first sensor section and the second sensor section include an identical imaging device.

(16)

An imaging control method including:
detecting, by a flicker detecting section, a flicker component of a light source, the flicker component being included in an image; and
controlling, by a controlling section, timing of imaging according to a detection result of the flicker component,
in which the controlling section controls the timing of the imaging according to timing of a peak or a bottom of the flicker component detected.

(17)

An imaging control method including:
detecting, by a flicker detecting section, a flicker component of a light source, the flicker component being included in an image, and outputting, according to exposure time of a sensor section at a time of the detection, information in which a phase of the flicker component detected is inverted.

(18)

An imaging control method including:
controlling, by a controlling section, first exposure time of a first sensor section at a time of detection of a flicker component and second exposure time of a second sensor section at a time of imaging; and
adjusting, by the controlling section, at least one of the first exposure time or the second exposure time so as to include, within each of the first exposure time and the second exposure time, an odd number or an even number of the flicker components each corresponding to one cycle and so as not to be an integer multiple of a cycle of the flicker component.

Although the frame rate is increased to efficiently detect the flicker component included in the image in the above-described embodiment, the frame rate is not necessarily increased. It is noted that, however, increasing the frame rate allows estimation of the frequency and the like of the flicker component with the sufficient number of samples based on the high frame rate and the image. Thus, the accuracy of the process result can be improved.

It is noted that the range of the shutter speed is limited as a result of the increased frame rate. Since the range of the shutter speed is limited, it is possible to omit the process of inverting the peak of the flicker component at the time of detection of the flicker component. It is noted that, however, in a case where the shutter speed at the time of actual photographing crosses one cycle of the flicker component, the above-described peak inversion process is performed.

The exposure time at the time of actual photographing may be determined on the basis of the mode set in the imaging apparatus 100. For example, in case of a manual mode, the shutter speed set by the user is the exposure time. Further, in case of an automatic mode, the shutter speed set by the imaging apparatus 100 (for example, the system controller 14) is the exposure time.

Although the half-press operation has been described as an example of the preparation operation in the above-described embodiment, the preparation operation may be another operation such as an operation of stopping or substantially stopping the imaging apparatus 100 for a certain period of time or more.

Further, although the digital signal processing section 20 including the flicker detecting section 25 is configured by hardware in the above-described embodiment, part or all of the flicker detecting section 25 or the digital signal processing section 20 may be configured by software.

Although the fluorescent lamp has been described as an example of the light source that generates the flicker in the above-described embodiment, the light source is not limited to the fluorescent lamp. The present disclosure can be applied to another light source (for example, LED) as long as the light source blinks with periodicity. In this case, the process of identifying the frequency of the LED may be performed as a preliminary step.

In addition, the above-described embodiment can also be applied to an XY address scanning type imaging device other than the CMOS imaging device and to an imaging apparatus using an imaging device to which a rolling shutter is applied.

In the above-described embodiment, a known signal process or another process for reducing the flicker may be performed instead of or together with the flickerless photographing.

For example, the imaging control apparatus may have configurations that include the system controller 14 and the digital signal processing section 20 as in the embodiment. In addition to these configurations, the imaging control apparatus may include the imaging section and other configurations. The configuration of the imaging apparatus itself may be the imaging control apparatus.

The imaging apparatus according to the above-described embodiment may be incorporated into medical equipment, a smartphone, a computer apparatus, game equipment, a robot, a security camera, and a moving body (a train, an airplane, a helicopter, a small aircraft, and the like).

Embodiments of the present disclosure have been specifically described above; however, the present disclosure is not limited to each of the above-described embodiments, and various modifications based on the technical ideas of the present disclosure are possible. For example, the configurations, methods, processes, shapes, materials, numerical values, and the like exemplified in the above-described embodiment are merely examples, and if necessary, different configurations, methods, processes, shapes, materials, numerical values, and the like may be used. A configuration for realizing the above-described embodiment and modification may be appropriately added. Further, the present disclosure can be realized not only by an apparatus but also by any form such as a method, a program, and a recording medium on which a program is recorded.

REFERENCE SIGNS LIST

100 Imaging apparatus
11 Imaging optical system
12 CMOS imaging device
14 System controller
20 Digital signal processing section
25, 25R, 25G, 25B Flicker detecting section

The invention claimed is:

1. An imaging control apparatus, comprising:
    circuitry configured to:
        detect a flicker component of a light source, wherein the flicker component is in an image;
        control timing of a capture of the image based on timing of a peak or a bottom of the flicker component and based on an exposure time of a sensor during the capture of the image;
        control the capture of the image at the bottom of the flicker component based on the exposure time of the sensor that is not an integer multiple of a cycle of the flicker component and based on the exposure time of the sensor includes an odd number of the flicker component corresponding to the cycle; and
        control the capture of the image at the peak of the flicker component based on the exposure time of the sensor is not the integer multiple of the cycle of the flicker component and the exposure time of the sensor includes an even number of the flicker component corresponding to the cycle.

2. The imaging control apparatus according to claim 1, wherein the circuitry is further configured to determine the exposure time of the sensor based on a mode of the sensor.

3. The imaging control apparatus according to claim 1, wherein at least one of the peak of the flicker component or the bottom of the flicker component is within the exposure time of the sensor.

4. The imaging control apparatus according to claim 1, wherein the timing of the capture of the image is at timing of exposure.

5. The imaging control apparatus according to claim 1, wherein the sensor includes an imaging device.

6. The imaging control apparatus according to claim 1, further comprising: an imaging device.

7. The imaging control apparatus according to claim 1, wherein the circuitry is further configured to determine the cycle of the flicker component based on a frequency of the flicker component.

8. An imaging control apparatus, comprising:
    circuitry configured to:
        detect a flicker component of a light source, wherein the flicker component is in an image
        output, based on exposure time of a sensor section at a time of the detection of the flicker component, information in which a phase of the flicker component is inverted;
        output the information based on the exposure time of the sensor that is not an integer multiple of a cycle of the flicker component and based on the exposure time of the sensor includes an odd number of the flicker component corresponding to the cycle; and
        output the phase of the flicker component without phase change based on the exposure time of the sensor that is not the integer multiple of the cycle of the flicker component and the exposure time of the sensor includes an even number of the flicker component corresponding to the cycle.

9. The imaging control apparatus according to claim 8, wherein the sensor includes an imaging device.

10. The imaging control apparatus according to claim 8, wherein the circuitry is further configured to determine the cycle of the flicker component based on a frequency of the flicker component.

11. An imaging control apparatus, comprising:
circuitry configured to:
control first exposure time of a first sensor at a time of detection of a flicker component and second exposure time of a second sensor section at a time of, capture of an image;
adjust at least one of the first exposure time or the second exposure time to include, one of an odd number of the flicker component or an even number of the flicker component corresponding to a cycle of the flicker component and not to be an integer multiple of the cycle of the flicker component;
adjust the second exposure time to include the odd number of the flicker component corresponding to the cycle based on the first exposure time includes the odd number of the flicker component corresponding to the cycle; and
adjust the second exposure time to include the even number of the flicker component corresponding to the cycle based on the first exposure time includes the even number of the flicker component corresponding to the cycle.

12. The imaging control apparatus according to claim 11, wherein the circuitry is further configured to determine the cycle of the flicker component based on a frequency of the flicker component.

13. The imaging control apparatus according to claim 11, wherein the circuitry is further configured to:
detect the flicker component; and
output information regarding the flicker component detected without a phase change.

14. The imaging control apparatus according to claim 11, wherein the first sensor and the second sensor include an identical imaging device.

15. An imaging control method, comprising:
detecting, by circuitry of an imaging control apparatus, a flicker component of a light source, wherein the flicker component is in an image;
controlling, by the circuitry, timing of a capture of the image
based on timing of a peak or a bottom of the flicker component and based on exposure time of a sensor during the capture of the image;
controlling, by the circuitry, the capture of the image at the bottom of the flicker component based on the exposure time of the sensor that is not an integer multiple of a cycle of the flicker component and based on the exposure time of the sensor includes an odd number of the flicker component corresponding to the cycle; and
controlling, by the circuitry, the capture of the image at the peak of the flicker component based on the exposure time of the sensor is not the integer multiple of the cycle of the flicker component and the exposure time of the sensor includes an even number of the flicker component corresponding to the cycle.

16. An imaging control method, comprising:
detecting, by circuitry of an imaging control apparatus, a flicker component of a light source, wherein the flicker component is in an image;
outputting, based on exposure time of a sensor at a time of the detection, information in which a phase of the flicker component is inverted;
outputting the information based on the exposure time of the sensor that is not an integer multiple of a cycle of the flicker component and based on the exposure time of the sensor includes an odd number of the flicker component corresponding to the cycle; and
outputting the phase of the flicker component without phase change based on the exposure time of the sensor that is not the integer multiple of the cycle of the flicker component and the exposure time of the sensor includes an even number of the flicker component corresponding to the cycle.

17. An imaging control method, comprising:
controlling, by circuitry of an imaging control apparatus, first exposure time of a first sensor section at a time of detection of a flicker component and second exposure time of a second sensor at a time of capture of an image;
adjusting, by the circuitry, at least one of the first exposure time or the second exposure time to include one of an odd number or an even number of the flicker component corresponding to a cycle of the flicker component and not to be an integer multiple of the cycle of the flicker component;
adjusting, by the circuitry, the second exposure time to include the odd number of the flicker component corresponding to the cycle based on the odd number of the flicker component corresponding to the cycle; and
adjusting, by the circuitry, the second exposure time to include the even number of the flicker component corresponding to the cycle based on the first exposure time includes the even number of the flicker component corresponding to the cycle.

\* \* \* \* \*